(12) United States Patent
Saito

(10) Patent No.: US 8,421,023 B2
(45) Date of Patent: Apr. 16, 2013

(54) IMAGING APPARATUS, CONTROL METHOD THEREOF, AND PROGRAM

(75) Inventor: Hidehiko Saito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 13/237,478

(22) Filed: Sep. 20, 2011

(65) Prior Publication Data

US 2012/0074327 A1    Mar. 29, 2012

(30) Foreign Application Priority Data

Sep. 28, 2010 (JP) ................. 2010-217376

(51) Int. Cl.
*H01L 27/146* (2006.01)

(52) U.S. Cl.
USPC ................................. 250/370.08

(58) Field of Classification Search ........ 250/370.01–370.15; 378/98.8
See application file for complete search history.

(56) References Cited

U.S. PATENT DOCUMENTS

| 6,035,013 | A  | * | 3/2000 | Orava et al. ............... 378/37 |
| 7,039,162 | B2 | * | 5/2006 | Ikeda et al. ............. 378/98.8 |
| 7,172,340 | B2 | * | 2/2007 | Oota ........................ 378/189 |
| 2004/0174953 | A1 | * | 9/2004 | Ikeda et al. ........... 378/98.8 |

FOREIGN PATENT DOCUMENTS

| JP | 2002-026302 A | 1/2002 |
| JP | 2008-117135 A | 5/2008 |

* cited by examiner

*Primary Examiner* — Kiho Kim
(74) *Attorney, Agent, or Firm* — Canon U.S.A., Inc. IP Division

(57) ABSTRACT

A flat panel sensor control unit reads image data from each region formed by dividing a flat panel. A write access control unit writes the image data read by the flat panel sensor control unit in a frame memory. A read access control unit starts reading the image data from the frame memory in response to that the writing of the image data to the frame memory becomes a predetermined state.

8 Claims, 13 Drawing Sheets

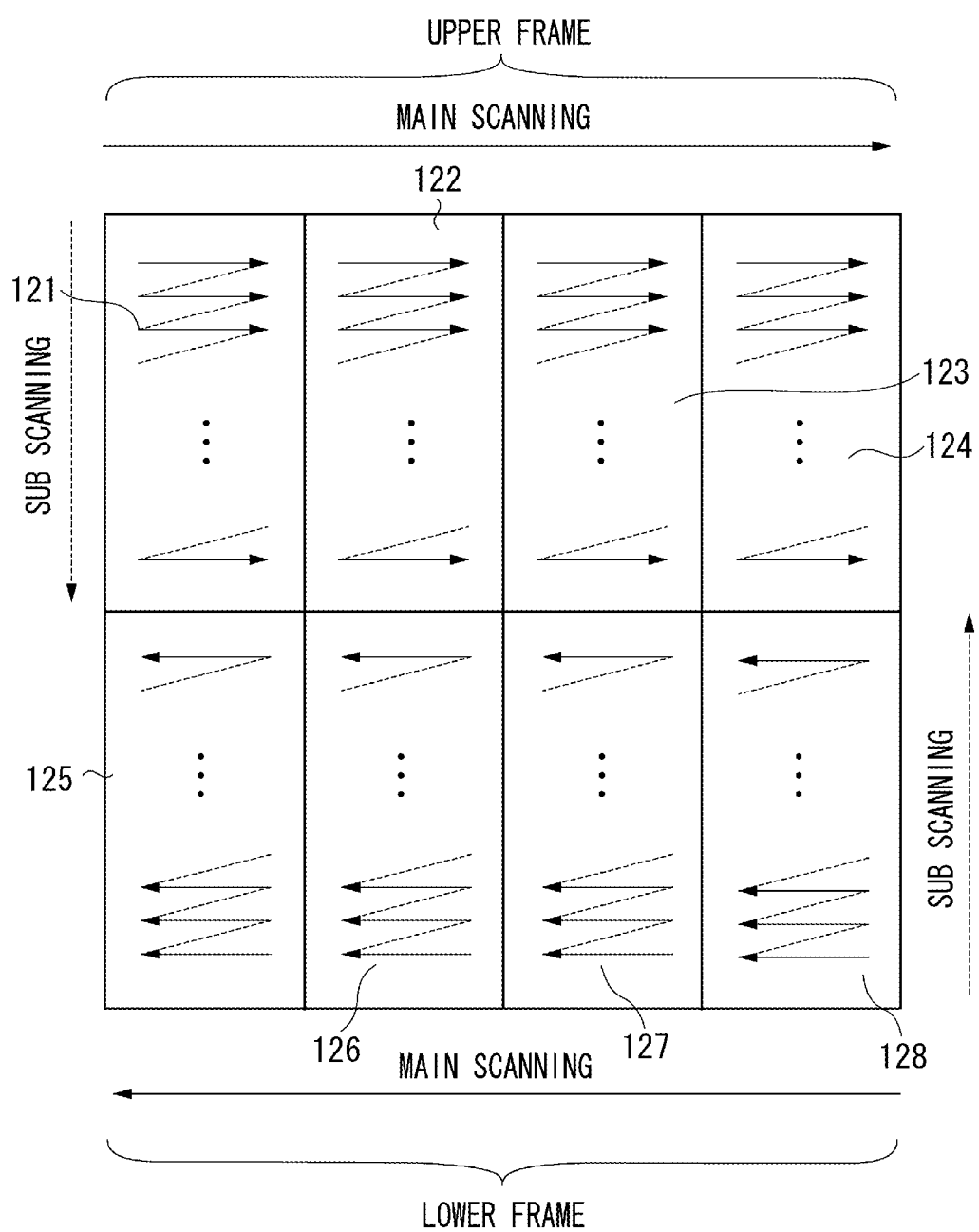

IMAGING APPARATUS, CONTROL METHOD THEREOF, AND PROGRAM

BACKGROUND OF THE INVENTION

1. Field of the Invention

The present invention relates to a radiation imaging apparatus, a control method for the radiation imaging apparatus, and a program. Especially, the present invention is suitable for an X-ray imaging apparatus including a C-shaped arm used in an operating room, or the like.

2. Description of the Related Art

The radiation imaging apparatus is a real-time observation apparatus. The radiation imaging apparatus is used, for example, in an operation using catheters, to display the state of the moving catheter in real time in order to determine to which direction the operator is to move his/her hand without injuring the organ.

In recent years, in the field of the radiation imaging apparatuses, in place of X-ray image intensifiers, in order to increase the resolution, reduce the volume, and reduce the distortion of an image, large-area flat-panel type radiation imaging apparatuses of an equal-magnification optical system using a photoelectric conversion device have been widely used.

One of the flat panels of equal-magnification optical system used for the radiation imaging apparatuses, there is a large-area flat panel which is made by two-dimensionally connecting image sensors generated on a silicon semiconductor wafer by a complementary metal-oxide semiconductor (CMOS) semiconductor manufacturing process. For example, Japanese Patent Application Laid-Open No. 2002-026302 discusses a manufacturing method of a large-area flat panel. In the method, in order to implement an imaging area with a size larger than a silicon semiconductor wafer in the large-area flat panel, rectangular image sensors cut in a strip shape from the silicone semiconductor wafer are tiled to form the large-area flat panel.

By simultaneously reading pixel data from a plurality of tiled image sensors, the reading speed of the pixel data of one image can be increased, so that the imaging cycle can be shortened and the real-time performance can be increased. However, the pixel data simultaneously read from the plurality of tiled image sensors cannot be directly displayed as it is, and also the data is not appropriate for image processing. Accordingly, the data needs to be converted into a raster image. The raster image is data for representing an image in a series of dots, and suitable for processing data such as a complicated figure and a photograph.

FIG. 11 illustrates an example of the two-dimensionally tiled image sensors. In the example in FIG. 11, in the large-area flat panel, four sheets in the horizontal direction, two sheets in the vertical direction, a total of eight sheets of image sensors 121 to 128 of the same performance are two-dimensionally tiled. External terminals for drive control and data output of the image sensors 121 to 128 are disposed at one short side of the individual image sensors. The upper frame and the lower frame of the image sensors are tiled such that short sides opposite to the external terminal sides face each other.

In the configuration, in the upper frame including the image sensors 121 to 124, the upper left point, the horizontal direction, and the vertical direction are regarded as the origin, the main scanning direction, and the sub-scanning direction respectively. In the lower frame including the image sensors 125 to 128, the lower right point, the horizontal direction, and the vertical direction are regarded as the origin, the main scanning direction, and the sub-scanning direction respectively. Further, reading the image data of the image sensors 121 to 128 that form the large-area flat panel is performed for pixel by pixel in order starting from the origin to the main scanning direction.

If the same reading clock is used in the eight image sensors 121 to 128, the image data pieces are simultaneously read from the image sensors 121 to 128. As a result, as compared to a case where the data is read from the image sensors one by one, the image data of one frame can be acquired at a speed eight times faster. However, it is not possible to directly display the read data on a monitor. Accordingly, the pixel data pieces read from the image sensors 121 to 128 are written in a frame memory while write addresses are appropriately updated.

FIG. 12 illustrates the order of reading the image data from the frame memory. As illustrated in FIG. 12, starting from the upper left as the origin, to the horizontal direction as the main scanning direction, and then in the vertical direction as the sub-scanning direction, the pixel data is stored in the frame memory. Then, the image data is successively read one pixel at a time from the frame memory, so that the data is converted into a raster image that can be displayed on the monitor.

FIGS. 13A and 13B are timing charts illustrating timing of reading the pixel data from the large-area flat panel and timing of outputting the raster image. FIGS. 13A and 13B include shooting triggers 1301 and 1311, timing 1302 and timing 1312 of a start of reading the pixel data from the large-area flat panel, and timing 1303 and timing 1313 of an end of reading of the pixel data from the large-area flat panel. FIGS. 13A and 13B further include timing 1304 and timing 1314 of a start of reading of the pixel data from the frame memory, timing 1305 and timing 1315 of an end of reading of the pixel data from the frame memory, timing 1306 and timing 1316 of a start of outputting the image data, and timing 1307 and timing 1317 of an end of outputting the image data.

First, output delay is described with reference to FIG. 13A. As illustrated in FIG. 13A, at the timing 1303 of the end of reading of the image data of one frame from a large-area flat panel 107, if reading of the image data from the frame memory starts at the timing 1304, between the start of shooting by the shooting trigger 1301 to the timing 1307 of the end of outputting the image data, output delay time of a little less than two frames occurs.

Next, a passing phenomenon is described with reference to FIG. 13B. As illustrated in FIG. 13B, if the timing 1314 of the start of reading the image data from the frame memory is too early, a phenomenon referred to as a passing phenomenon occurs. In the passing phenomenon, image data that is not yet written in the frame memory is tried to be read occurs.

To solve this issue, Japanese Patent Application Laid-Open No. 2008-117135 discusses a technique for performing appropriate control in reading image data. In the technique, when dividing and reading the image data from a dynamic random access memory (DRAM) while writing the image data in the DRAM, the read processing of the image data is controlled so as not to pass the write processing.

However, when writing or reading the pixel data in/from the frame memory is stopped to avoid the occurrence of the passing, the reading process of the pixel data from the frame memory is interfered every certain cycle, and accordingly, the real-time performance is decreased.

Further, in a case of a system for performing image processing, or the like in response to an end of outputting the image data of one frame, if the access is stopped as described above, the image data output processing may be interfered. Then, the image data output of each frame does not end at the constant cycle. As a result, flicker due to jitter of the frame or the like occurs in the image data on which the image processing is performed. Further, the write address of the pixel data to the frame memory differs in each pixel data read from the image sensor. Accordingly, a memory control unit for monitoring the addresses may be complicated.

SUMMARY OF THE INVENTION

The present invention is directed to a technique for enabling moving image shooting and data transmission to be performed in a constant cycle at a high speed without lack using a simple configuration.

According to an aspect of the present invention, an imaging apparatus including an imaging unit in which a plurality of image sensors is arranged, an imaging control unit configured to read image data from each region formed by dividing the imaging unit, a write control unit configured to write the image data read by the imaging control unit in a recording unit, and a read control unit configured to start reading the image data from the recording unit in response to that the writing of the image data to the recording unit becomes a predetermined state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates an example of two-dimensionally tiled image sensors.

DESCRIPTION OF THE EMBODIMENTS

Various exemplary embodiments, features, and aspects of the invention will be described in detail below with reference to the drawings.

Figure 1:
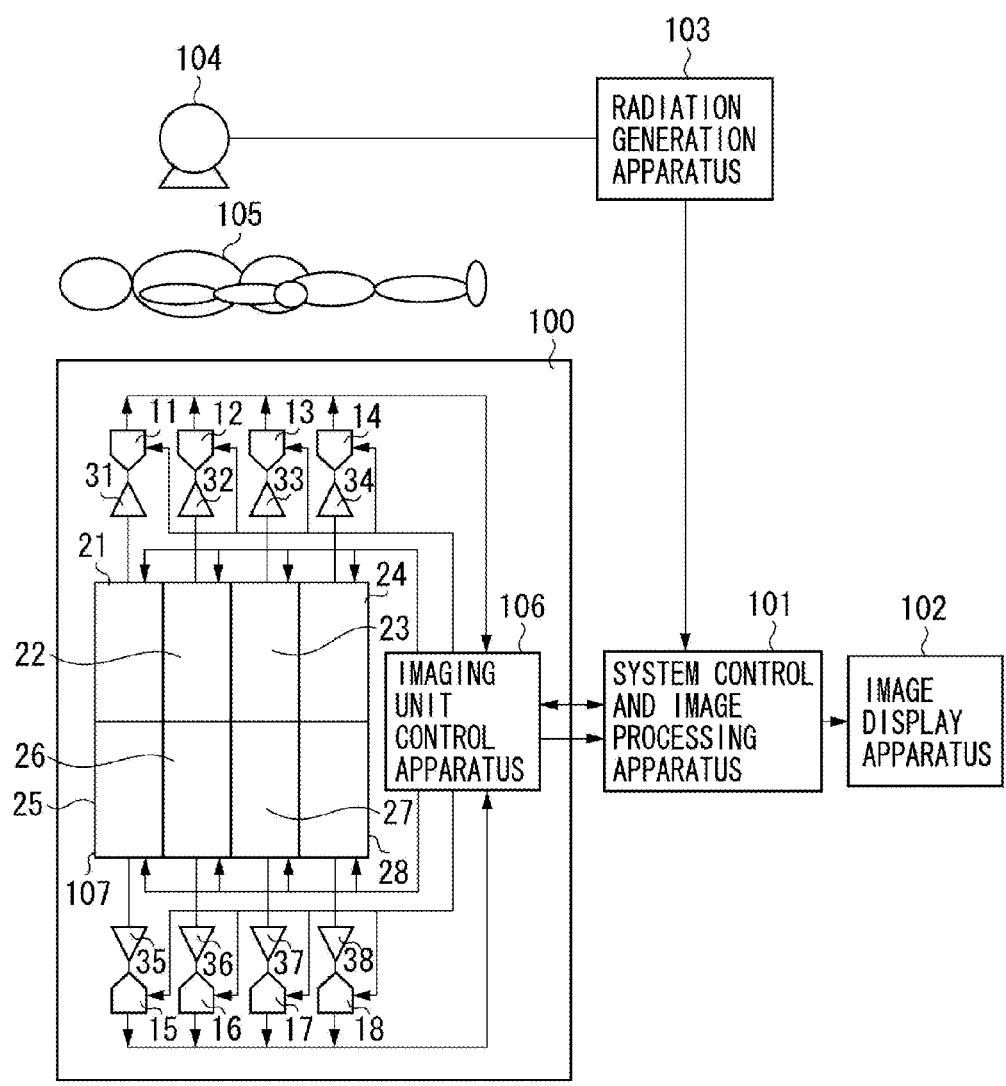
FIG. 1 is a schematic view illustrating a system configuration of a large-area flat panel type radiation imaging apparatus according to an exemplary embodiment of the present invention.

A first exemplary embodiment of the present invention is described. FIG. 1 is a schematic view illustrating a system configuration of a large-area flat panel type radiation imaging apparatus according to the first exemplary embodiment of the present invention. As illustrated in FIG. 1, the system include a radiation imaging apparatus 100, a system control and image processing apparatus 101, an image display apparatus 102, a radiation generation apparatus 103, and an X-ray tube 104.

The radiation imaging apparatus 100 includes an imaging unit control apparatus 106, a large-area flat panel (hereinafter, simply referred to as flat panel) 107 having two-dimensionally arranged eight image sensors 21 to 28, eight amplifiers 31 to 38 connected to each of the eight image sensors 21 to 28 respectively, and eight analog-digital (A/D) converters 11 to 18 connected to each of the amplifiers 31 to 38 respectively. The radiation imaging apparatus 100 is connected to the system control and image processing apparatus 101 such as a personal computer (PC).

The system control and image processing apparatus 101 is connected to the image display apparatus 102 such as a monitor, and the radiation generation apparatus 103. The system control and image processing apparatus 101 generates radiation from the X-ray tube 104 by controlling the radiation generation apparatus 103. The radiation that passed through a subject 105 is converted into visible light by a scintillator (not shown). After the photoelectric conversion, A/D conversion is performed on the light by the A/D converters 11 to 18. Then, image data corresponding to the X-ray irradiation is transferred from the radiation imaging apparatus 100 to the system control and image processing apparatus 101. The transferred image data is subjected to image processing in the system control and image processing apparatus 101, and displayed in real time on the image display apparatus 102.

Figure 2:
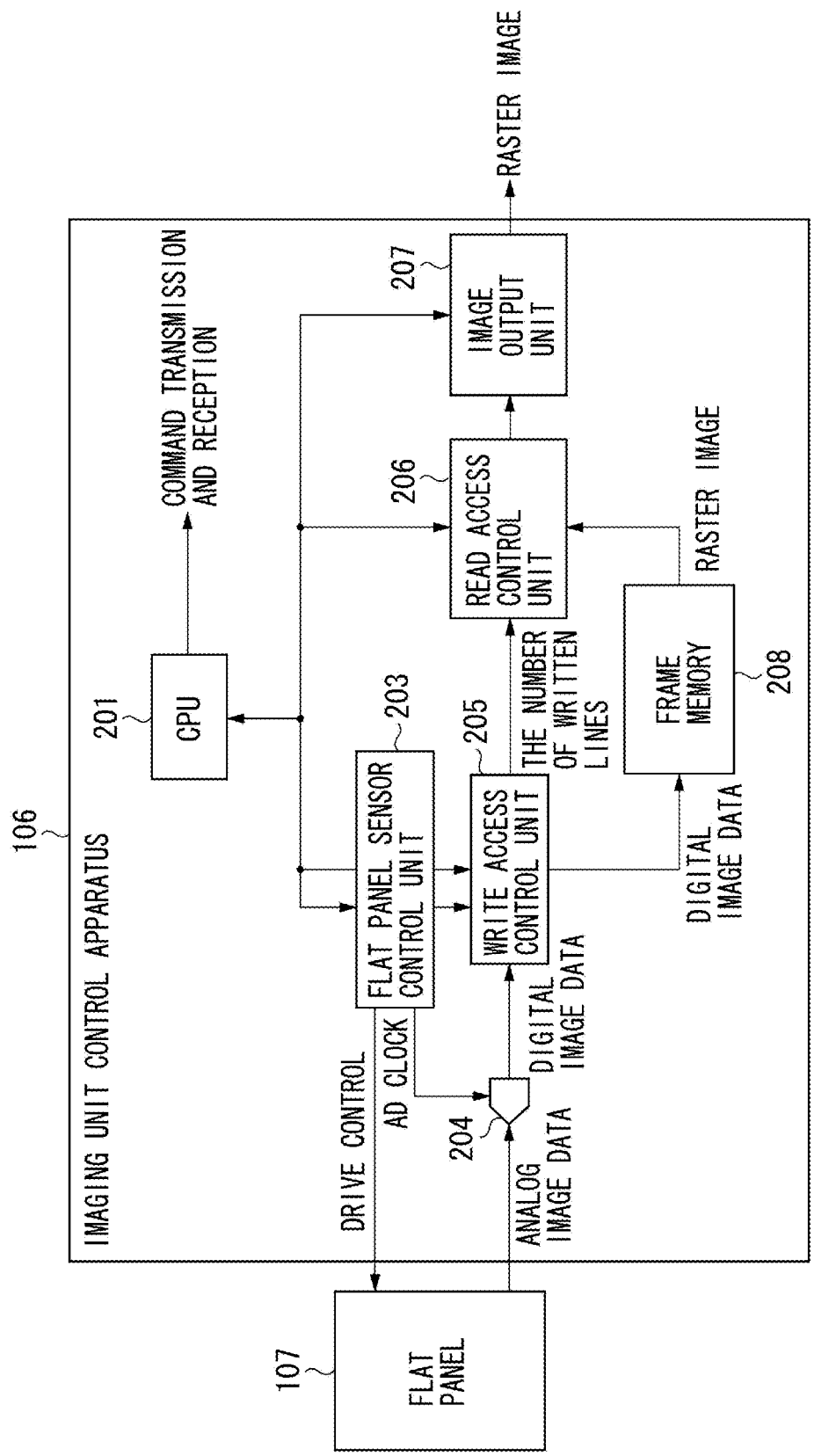
FIG. 2 illustrates a configuration of an imaging unit control apparatus.

FIG. 2 illustrates a configuration of the imaging unit control apparatus 106. In FIG. 2, the imaging unit control apparatus 106 includes a central processing unit (CPU) 201, a flat panel control unit 203, an A/D conversion unit 204, and a write access control unit 205. The imaging unit control apparatus 106 further includes a read access control unit 206, an image output unit 207, and a frame memory 208.

The CPU 201 transmits and receives a command to and from the system control and image processing apparatus 101, and performs overall control of the radiation imaging apparatus 100. The flat panel sensor control unit 203 performs drive control of each image sensor of the flat panel 107, and outputs photoelectrically converted pixel data from the image sensors as analog image data. In addition, the flat panel sensor control unit 203 controls an AD clock for converting the analog image data read from the image sensors into digital image data, and outputs the data to the A/D conversion unit 204.

The write access control unit 205 receives the digital image data output from the A/D conversion unit 204, and writes the digital image data in the frame memory 208 by controlling the write address such that the data is arranged to be a raster image in the frame memory 208. The write access control unit 205 measures the number of lines in which writing of the digital image data is completed in an upper frame in the frame memory 208, and notifies the read access control unit 206 of the information.

The read access control unit 206 compares the number of lines appropriate for starting the reading process set by the CPU 201 with the number of written lines notified by the write access control unit 205. As a result of the comparison, when the number of written lines becomes equal to the number of lines appropriate for starting the reading process, the read access control unit 206 sequentially read the image data (raster image) from the frame memory 208, and transfers the data to the image output unit 207.

The image output unit 207 outputs the raster image to the system control and image processing apparatus 101. The flat panel sensor control unit 203 is an example of an imaging control unit. The write access control unit 205 is an example of a write control unit. The read access control unit 206 is an example of a read control unit. The frame memory 208 is an example of a recording unit.

Figure 3:
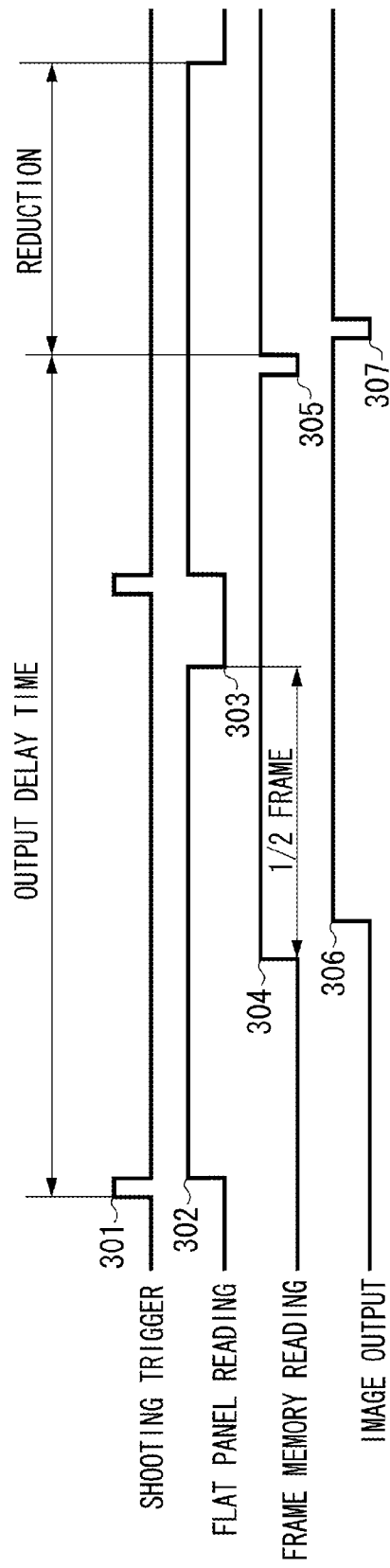
FIG. 3 is a time chart illustrating a method for reducing output delay time according to the exemplary embodiment of the present invention.

FIG. 3 illustrates a time chart illustrating a method for reducing output delay time according to the present exemplary embodiment. FIG. 3 includes, a shooting trigger 301, timing 302 indicating a start of reading the pixel data from the flat panel 107, and timing 303 indicating an end of reading the pixel data from the flat panel 107. Further, in FIG. 3, timing 304 indicates a start of reading the pixel data from the frame memory 208. Timing 305 indicates an end of reading the pixel data from the frame memory 208. Timing 306 indicates a start of outputting the image data. Timing 307 indicates an end of outputting the image data.

In the present exemplary embodiment, as illustrated in FIG. 3, the reading of the image data from the frame memory 208 starts at the timing 304 such that a half (½) frame of the image data is read from the frame memory 208 at the timing 303 of the end of the reading of the image data from the flat panel 107. By the processing, the output delay time of the image data can be shortened to a minimum in the present exemplary embodiment.

Figure 4:
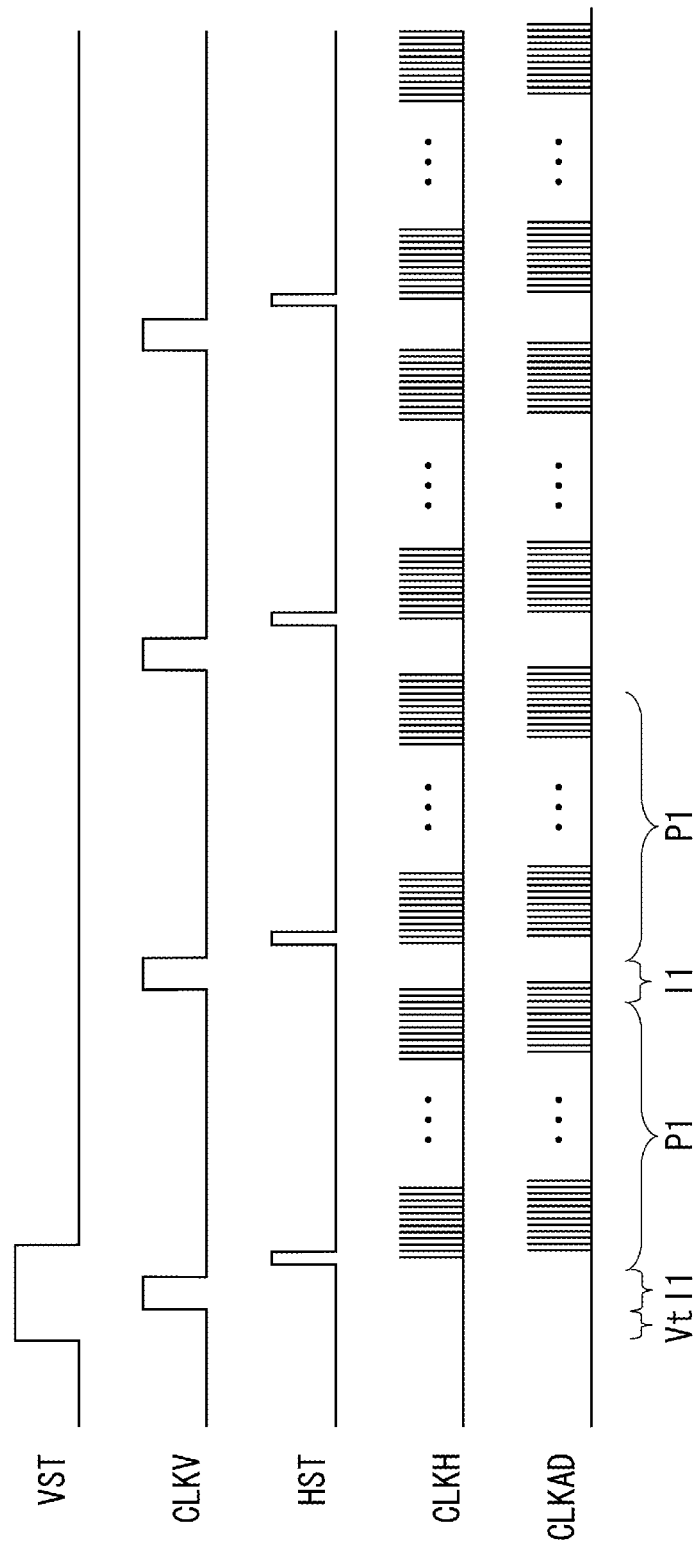
FIG. 4 is a time chart illustrating an example of operation at a start of reading image data from a flat panel in a no-binning setting.

FIG. 4 is a time chart illustrating an example of an operation at a start of reading of the image data from the flat panel 107 in a no-binning setting. In FIG. 4, a vertical shift clock signal CLKV indicates a shift clock of a vertical shift register which is built in a semiconductor substrate (not shown) in an image sensor. A vertical shift register start signal VST is a start signal of the vertical shift register. A first pixel in a vertical direction of the vertical shift register becomes valid by a combination of the signal VST and the clock signal CLKV. In synchronization with the clock signal CLKV, validity or invalidity of the pixels is sequentially switched in the vertical direction, and the line to be read is switched.

A horizontal shift clock signal CLKH indicates a shift clock of a horizontal shift register which is built in the semiconductor substrate (not shown) in the image sensor. A horizontal shift register start signal HST is a start signal of the horizontal shift register. A first pixel in a horizontal direction of the horizontal shift register becomes valid by a combination of the signal HST and the clock signal CLKH. In synchronization with the clock signal CLKH, validity or invalidity of the pixels is sequentially switched in the horizontal direction, and the image data of one line in the image sensor is sequentially output to an analog output terminal.

In synchronization with the clock signal CLKH, the analog image data is sequentially output from the image sensors 21 to 28 to the analog output terminals. Thus, the A/D converters 11 to 18 convert the analog image data into digital image data by an A/D conversion clock signal CLKAD that is synchronized with the clock signal CLKH.

The writing speed of the image data to the frame memory 208 is faster than the reading speed of the image data from the image sensors 21 to 28. Accordingly, time T1 necessary for reading the image data of one frame from the flat panel 107 is limited by the reading speed of the image data from the image sensors 21 to 28. Consequently, the time T1 can be calculated by the following equation 1 using time Vt required for vertical synchronization of the image sensor, the number of horizontal pixels P1 of the image sensor, the number of vertical lines L1 of the image sensor, a reading line interval I1, and a cycle t1 of the clock signal CLKH.

$$T1=(P1+I1) \cdot L1 \cdot t1+Vt \qquad \text{equation 1}$$

Figure 5:
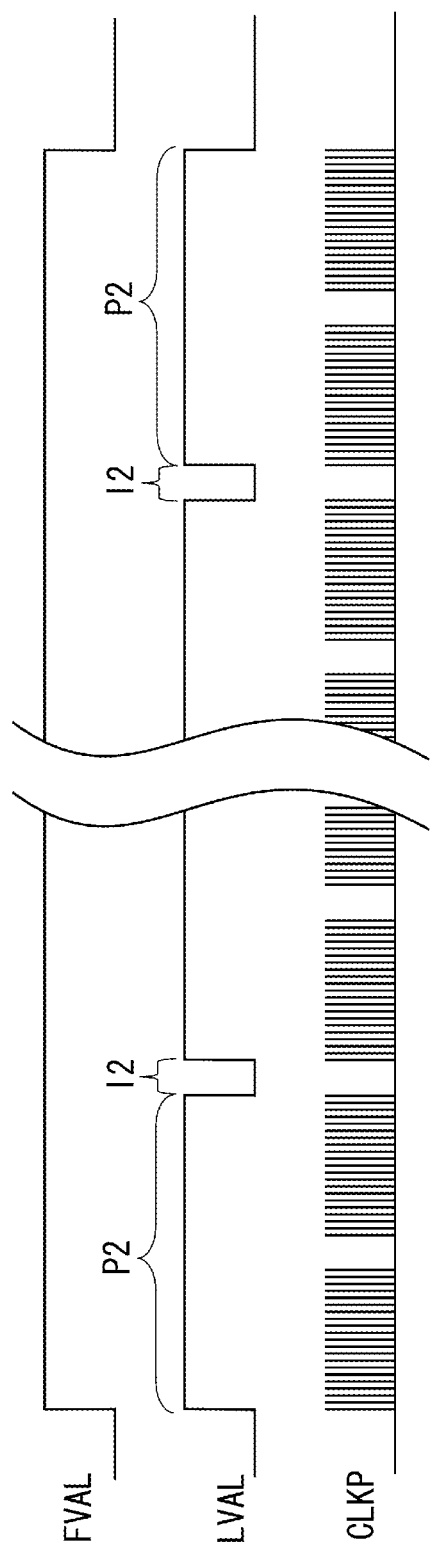
FIG. 5 is a time chart illustrating an example of operation of outputting image data read from a frame memory from an image output unit in the no-binning setting.

FIG. 5 is a time chart illustrating an example of an operation of output of the image data read from the frame memory 208 from the image output unit 207 in the no-binning setting.

A signal FVAL indicates valid data in a frame unit. A signal LVAL indicates validity or invalidity of output data in a line unit. A signal CLKP is a synchronization signal of the output data. The image data is output from the image output unit 207 in synchronization with the signal CLKP. A valid period P2 of the signal LVAL is constant. An invalid period (hereinafter, referred to as output line interval) I2 of the signal LVAL in the valid period of the signal FVAL is constant too. In response to a start of the output of the image data from the image output unit 207, the data output is continued in the same cycle until the output of the image data of one frame is completed.

The reading speed of the image data from the frame memory 208 is faster than the output speed of the image data from the image output unit 207. Accordingly, time T2 for outputting the image data of one frame does not depend on the reading time of the image data from the frame memory 208. The time T2 is calculated by the following equation 2 using the number of pixels P2 in the horizontal direction in one frame, the number of lines L2 in the vertical direction in one frame, an output line interval I2, and a cycle t2 of the signal CLKP.

$$T2=(P2 \cdot L2+I2 \cdot (L2-1)) \cdot t2 \qquad \text{equation 2}$$

The number of lines N appropriate for starting the reading to minimize the output delay time is calculated by the following equation 3 using time T2/2 necessary for reading the image data of a half (½) frame from the frame memory 208, and the time T1 necessary for reading the image data of one frame from the flat panel 107.

$$N = L1 - \frac{L1 \cdot T2}{2 \cdot T1}$$
$$= L1 - \frac{L1 \cdot (P2 \cdot L2 + I2 \cdot (L2-1)) \cdot t2}{2 \cdot ((P1+I1) \cdot L1 \cdot t1 + Vt)} \qquad \text{equation 3}$$

A second exemplary embodiment of the present invention is described. A configuration of a large-area flat panel type radiation imaging apparatus in the second exemplary embodiment is similar to that in the first exemplary embodiment illustrated in FIG. 1. Accordingly, in the following description, the configuration of the large-area flat panel type radiation imaging apparatus in the present exemplary embodiment is described using the reference numerals in FIG. 1.

Figure 6:
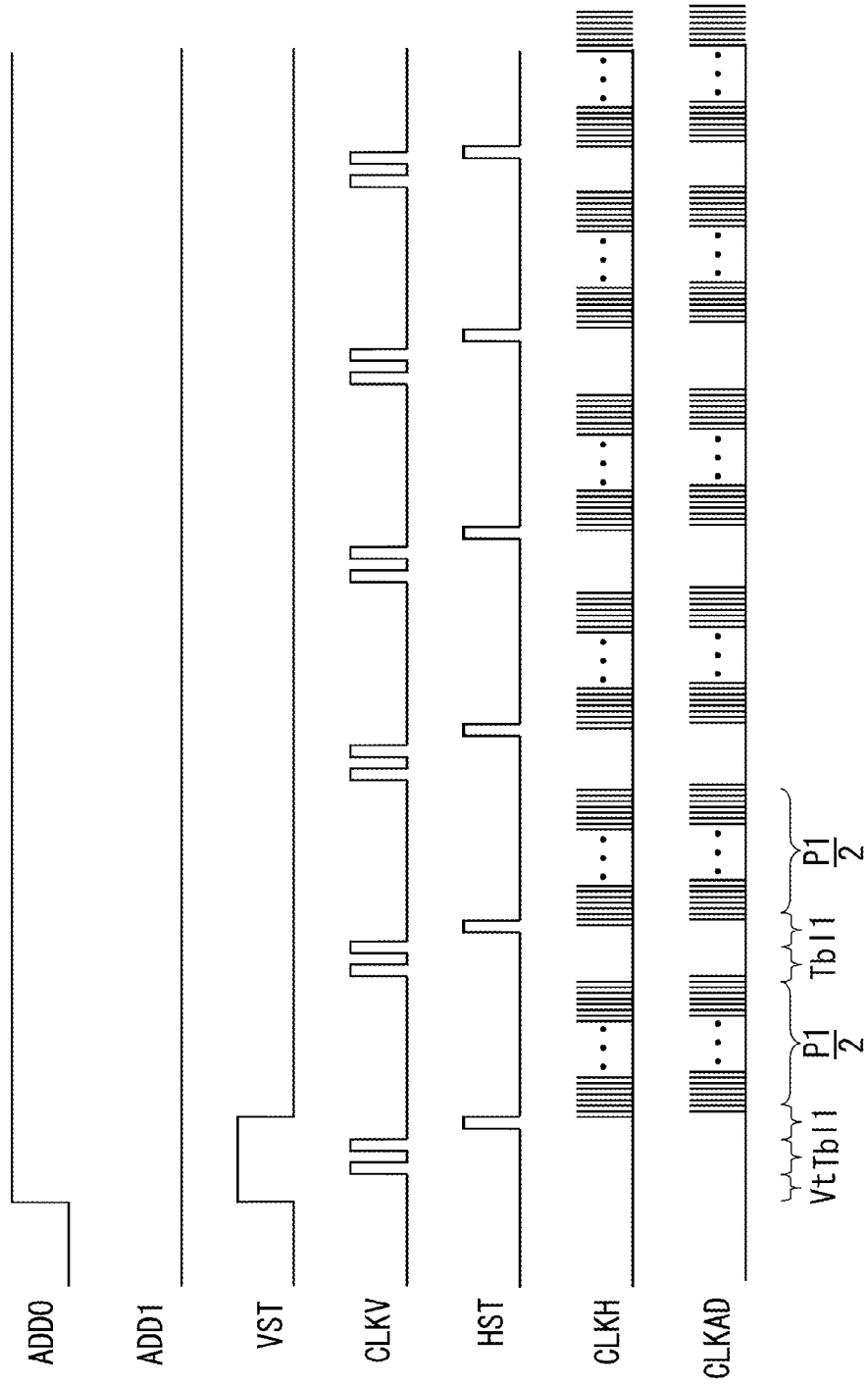
FIG. 6 is a time chart illustrating an example of operation at a start of reading of image data from a flat panel including image sensors having a binning processing function.

FIG. 6 is a time chart illustrating an example of an operation at a start of reading of image data from the flat panel 107 including image sensors having a binning processing function. The binning processing function is to add and average 2×2 pixels or 4×4 pixels and outputting the value.

In FIG. 6, signals ADD0 and ADD1 are used for specifying a shooting mode. More specifically, if (ADD0, ADD1)=(1, 0), 2×2 binning can be specified, if (ADD0, ADD1)=(0, 1), 4×4 binning can be specified, and if (ADD0, ADD1)=(0, 0), no-binning can be specified. Signals other than ADD0 and ADD1 are similar to those described in the first exemplary embodiment. If (ADD0, ADD1)=(0, 0), the operation similar to that in the first exemplary embodiment is performed.

The term "2×2 binning" means a binning mode for adding and averaging 2×2 pixels and outputting the value. The term "4×4 binning" means a binning mode for adding and averaging 4×4 pixels and outputting the value. Hereinafter, the second exemplary embodiment is described with an example of the 2×2 binning.

In the 2×2 binning, a shift in the horizontal direction is performed by adding and averaging the 2×2 pixels, and then, the size is to be half (½) of the size of the output of the pixels in the no-binning setting. In the vertical direction, a shift is performed by two lines. Accordingly, as compared to the no-binning setting, line shift time Tb for shifting by one line is required to the output of each line. Then, time T1' for reading the pixel data of one frame in the 2×2 binning in the flat panel 107 is calculated by the following equation 4.

$$T1' = \left(\frac{P1}{2} + I1\right) \cdot \frac{L1}{2} \cdot t1 + \frac{L1}{2} \cdot Tb + Vt \quad \text{equation 4}$$

Figure 7:
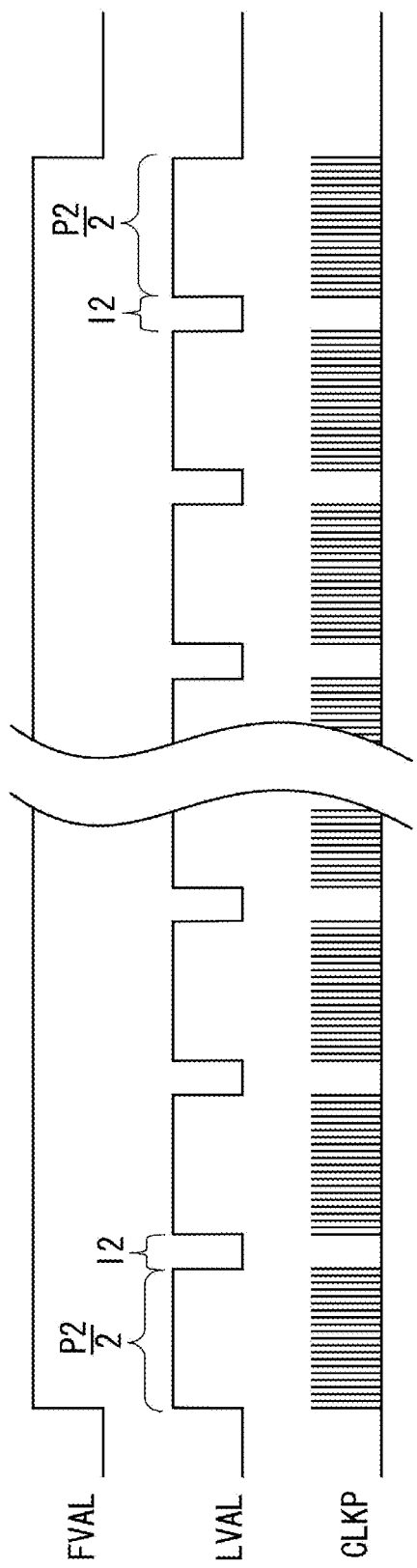
FIG. 7 is a time chart illustrating an example of operation of outputting image data read from a frame memory from an image output unit in a 2×2 binning setting.

FIG. 7 is a time chart illustrating an example of an operation of output of the image data read from the frame memory 208 from the image output unit 207 in the 2×2 binning setting.

As compared to the time chart in the no-binning setting in FIG. 5, both of the number of pixels in the horizontal direction and the number of lines in the vertical direction decrease by half (½). Then, the interval of the signal LVAL and the number of the signals LVAL also decrease by half (½). Accordingly, time T2' for outputting the image data of one frame in the 2×2 binning is calculated by the following equation 5.

$$T2' = \left(\frac{P2}{2} \cdot \frac{L2}{2} + I2 \cdot \left(\frac{L2}{2} - 1\right)\right) \cdot t2 \quad \text{equation 5}$$

The number of lines N appropriate for starting the reading to minimize the output delay time can be calculated by the following equation 6.

$$N = \frac{L1}{2} - \frac{L1 \cdot T2'}{4 \cdot T1'} \quad \text{equation 6}$$

Further, if a binning mode coefficient M is given, the number of lines N appropriate for starting the reading can be calculated by the following equation 7.

$$N = \frac{L1}{M} - \frac{L1 \cdot \left(\frac{P2 \cdot L2}{M^2} + I2 \cdot \left(\frac{L2}{M} - 1\right)\right) \cdot t2}{2 \cdot M \cdot \left(\left(\frac{P1}{M} + I1\right) \cdot \frac{L1}{M} \cdot t1 + \frac{L1}{M} \cdot (M-1) \cdot Tb + Vt\right)} \quad \text{equation 7}$$

$$M = \begin{cases} 1: \text{ no binning} \\ 2: 2 \times 2 \text{ binning} \\ 4: 4 \times 4 \text{ binning} \end{cases}$$

Figure 8:
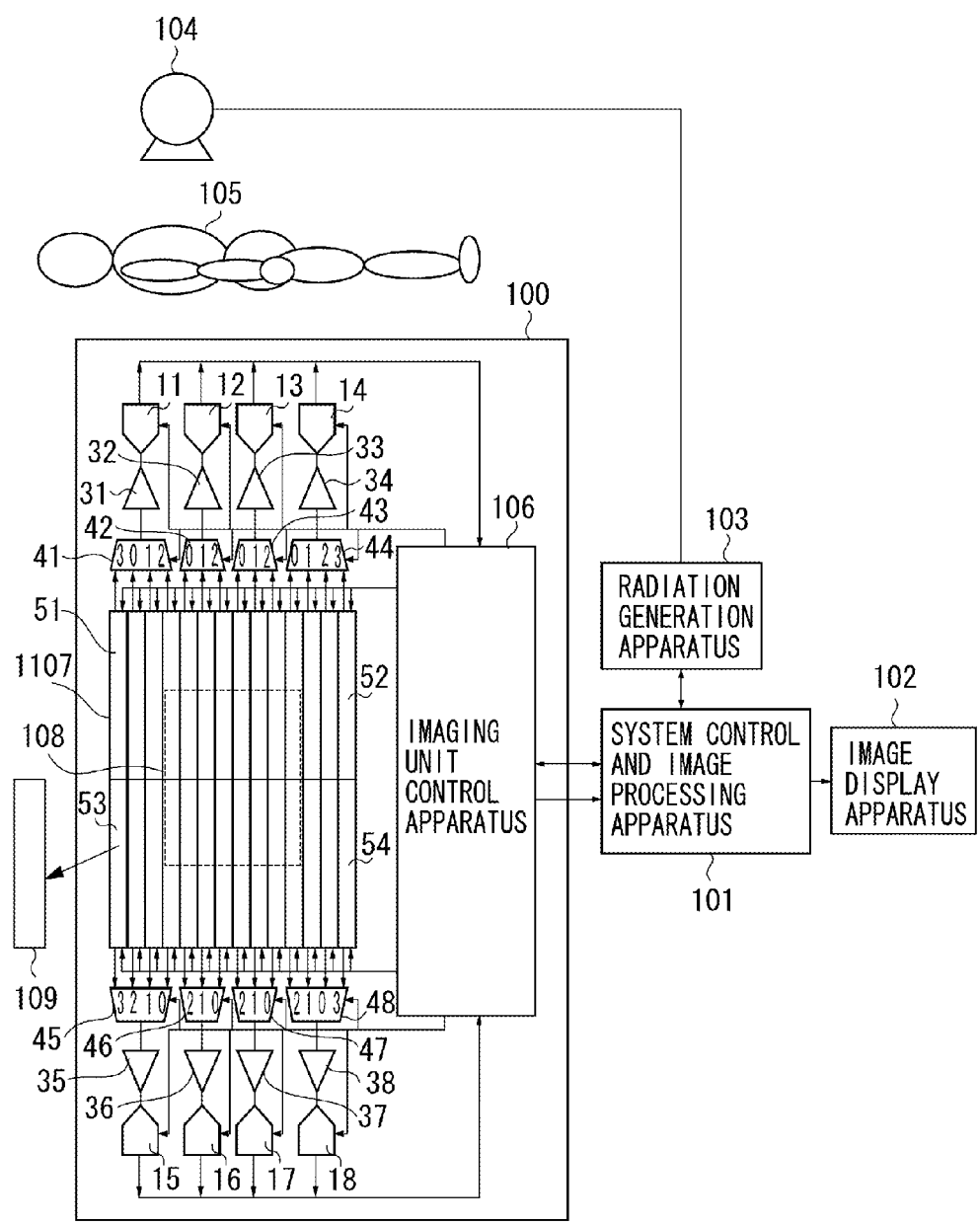
FIG. 8 is a schematic view illustrating a system configuration of a large-area flat panel type radiation moving image shooting apparatus according to an exemplary embodiment of the present invention.

A third exemplary embodiment of the present invention is described. FIG. 8 is a schematic view illustrating a system configuration of a large-area flat panel type radiation moving image shooting apparatus according to the third exemplary embodiment of the present invention. In FIG. 8, components similar to those in the configuration illustrated in FIG. 1, the same reference numerals are applied.

In the present exemplary embodiment, in a flat panel 1107, image sensors 109 that are cut in a strip shape from a silicone semiconductor wafer are tiled in a matrix of 2 rows and 14 columns on a plane base (not shown). The image sensors 109 are developed as area sensors for connection. In the image sensors 109, photoelectric conversion elements are two-dimensionally arranged at an equal pitch. The adjacent image sensors on the plane base are tiled such that the photoelectric conversion elements are arranged at the pitch the same as that on the image sensors across the image sensors.

To the upper side and lower side of the flat panel 1107, external terminals (electrode pads, not shown) of the image sensors 109 that are arranged in matrix are arranged in line. The electrode pads of the image sensors 109 are connected to an external circuit with a flying lead type printed wiring board (not shown). Analog multiplexers 41 to 48 select output of the image sensors 109 according to a control signal from the imaging unit control apparatus 106, and output image data to the amplifiers 31 to 38 connected respectively.

The A/D converters 11 to 18 convert the analog image data output from the respectively connected amplifiers 31 to 38 into digital image data according to the synchronous clock output from the imaging unit control apparatus 106, and outputs the digital image data to the imaging unit control apparatus 106. The imaging unit control apparatus 106 converts the digital image data of each block output from the A/D converters 11 to 18 into a raster image, and transfers the raster image to the system control and image processing apparatus 101.

In the third exemplary embodiment, the image sensor 109 cut in the strip shape is about 140 mm long and about 20 mm wide. The image sensors 109 are tiled in a matrix of 2 rows and 14 columns to form the flat panel 1107. Accordingly, the flat panel 1107 has a shape of a square of about 280 mm long and about 280 mm wide, that is, about 11 inches per side. In the present exemplary embodiment, a mode of shooting can be selected from an 11-inch mode in which the entire imaging region of about 11 inches per side is irradiated with the radiation, and a 6-inch mode in which an irradiation angle of the radiation is narrowed to an angle of about 6.3-inch square, as illustrated in a region of a dashed line 108.

Figure 9:
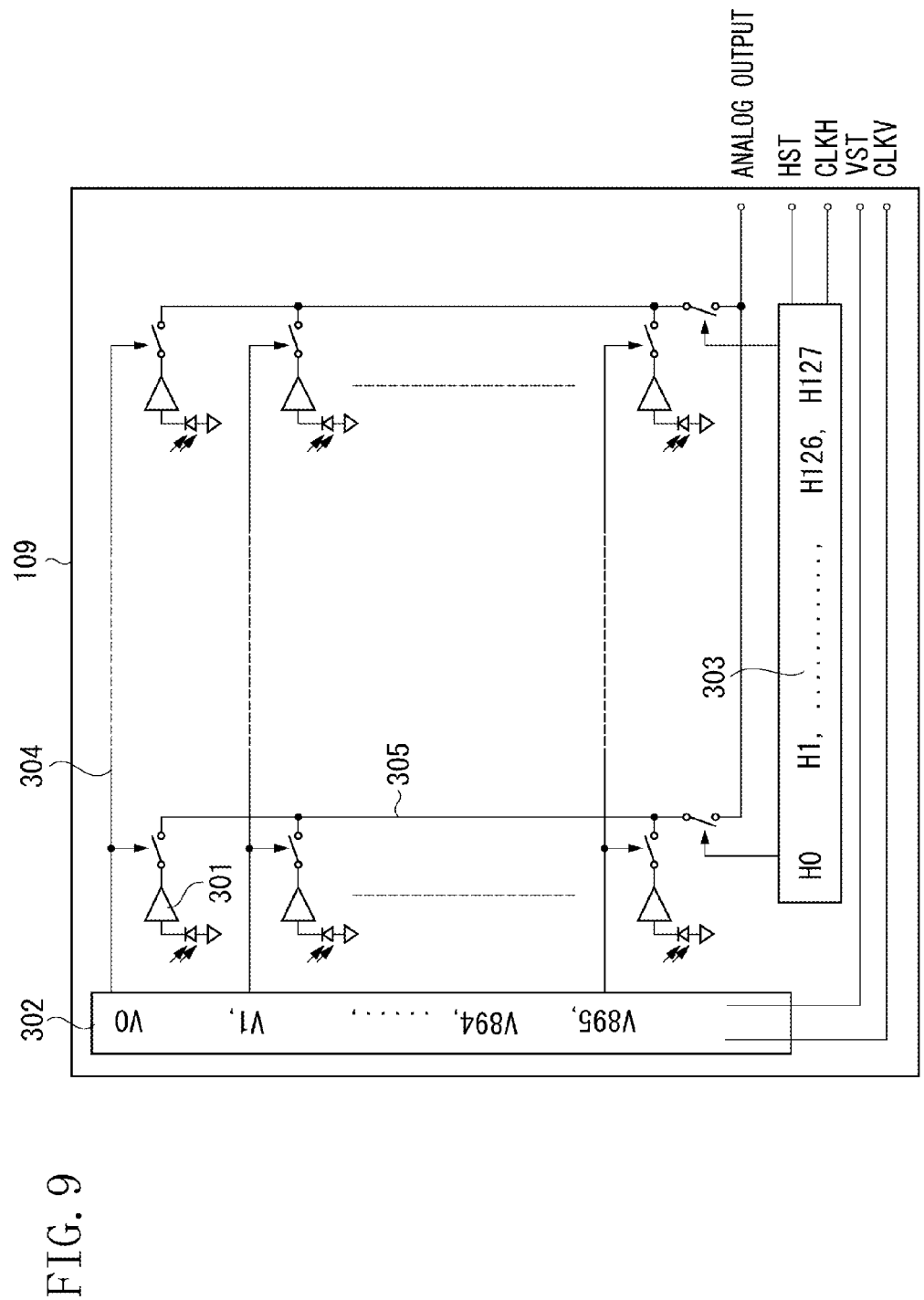
FIG. 9 illustrates an inner configuration of an image sensor.
Figure 10A:
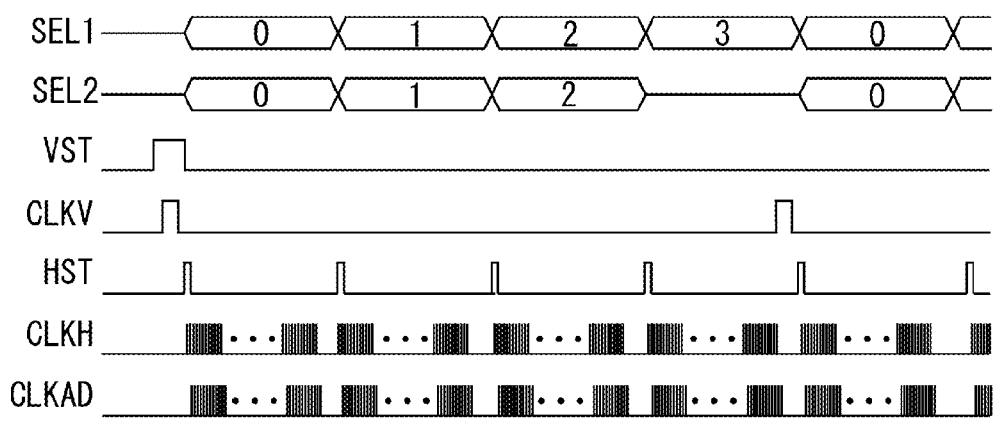
FIGS. 10A and 10B are time charts illustrating examples of operation of reading image data from a flat panel formed by tiling image sensors.
Figure 10B:
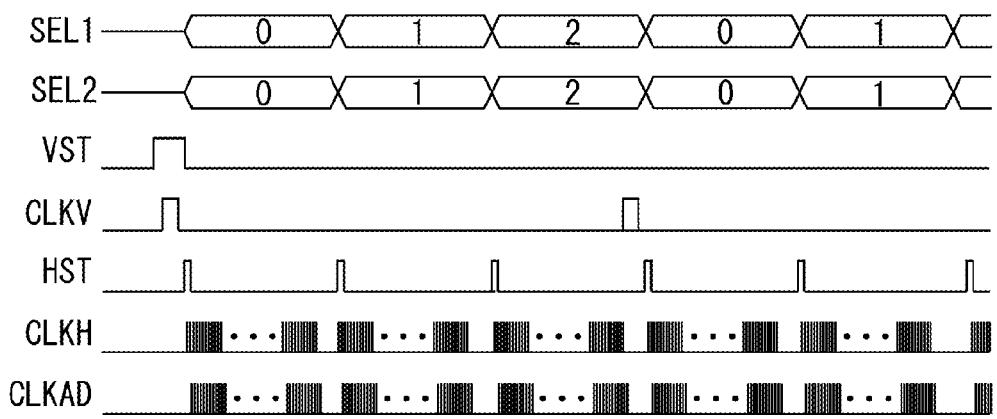
Figure 12:
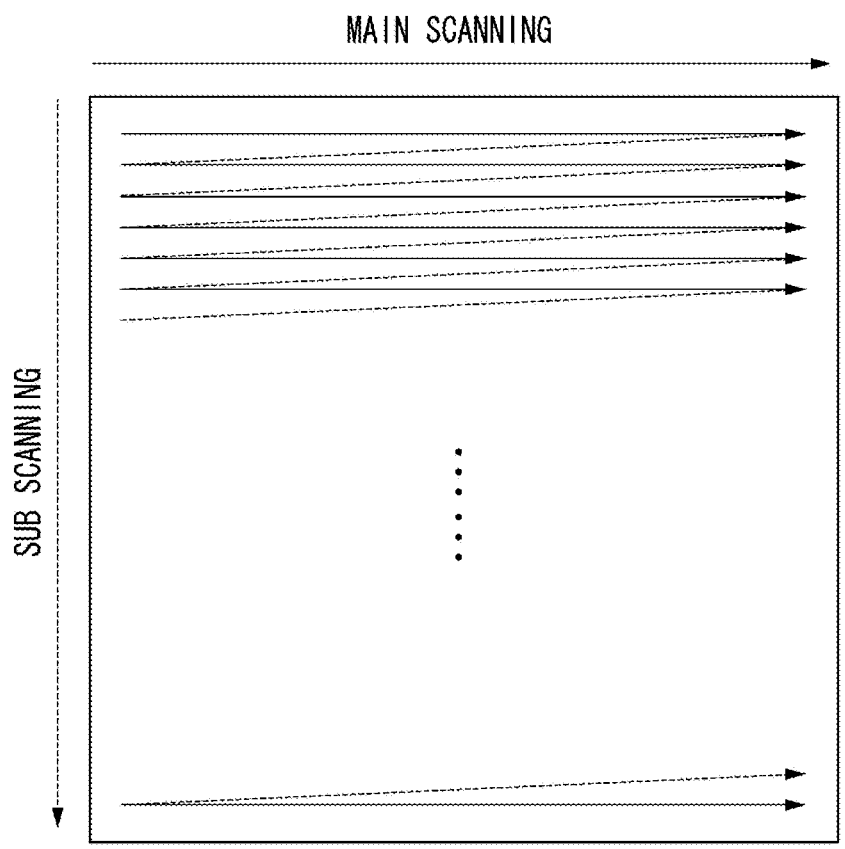
FIG. 12 illustrates a reading order of image data from a frame memory.
Figure 13A:
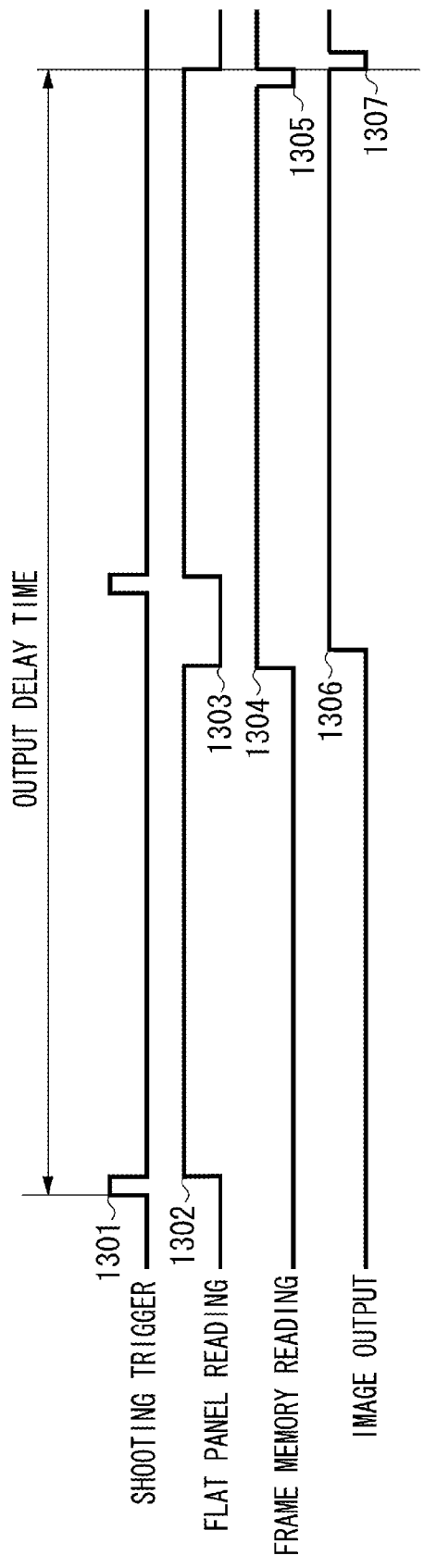
FIGS. 13A and 13B are timing charts illustrating timing of reading pixel data and timing of outputting a raster image from a flat panel.
Figure 13B:
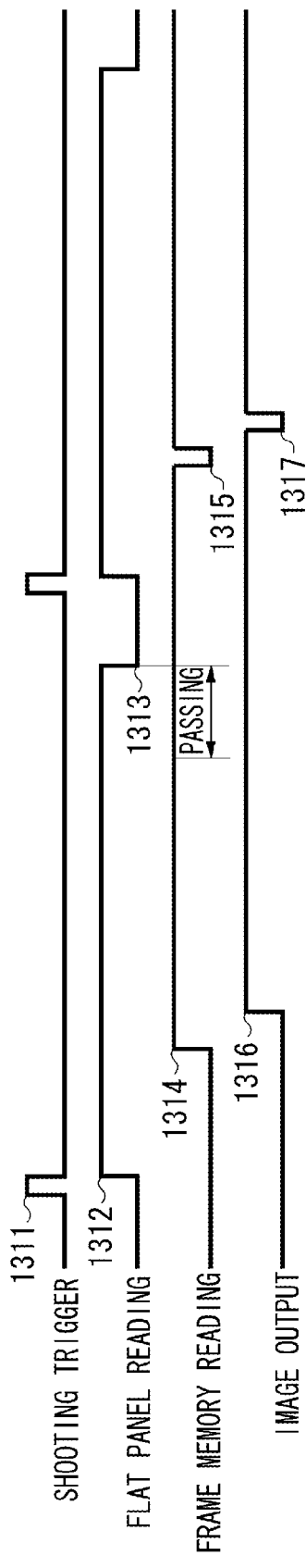

FIG. 9 illustrates an inner configuration of the image sensor 109. FIGS. 10A and 10B are time charts illustrating examples of operations of reading image data from the flat panel 1107 formed by tiling the image sensors 109.

As illustrated in FIG. 9, the image sensor 109 includes a pixel circuit 301 including two-dimensionally arranged photoelectric conversion elements, and a vertical shift register 302 and a horizontal shift register 303 as read control circuits. To the image sensor 109, the horizontal shift register start signal HST, the vertical shift register start signal VST, the horizontal shift clock signal CLKH, and the vertical shift clock signal CLKV are input from an external terminal.

In FIGS. 10A and 10B, if the signal CLKV rises in a state that the signal VST is "H", an inner circuit in the vertical shift register 302 is reset. Then, "H" is output to an output V0 of the vertical shift register 302, and a pixel output of one line controlled by a row control signal 304 becomes valid. If the signal CLKH rises in the "H" state of the signal HST, an inner circuit in the horizontal shift register 303 is reset. Then, "H" is output to an output H0 of the horizontal shift register 303, and further output to a column output line 305. In the valid pixels of one line, the output of the pixel circuit 301 selected by the output H0 is output to the analog output terminal.

Then, a CLKH pulse is sequentially input, and the "H" output of the horizontal shift register 303 sequentially shifts to H0, H1, ..., H126, and H127. Thus, the reading of one line is completed. Next, the vertical shift clock signal CLKV is input, and an "H" output of the vertical shift register 302 is switched to V1. Then, the above-described reading of one line is performed. These operations are sequentially repeated, so that reading of the image data of each pixel from the image sensors 109 can be performed.

In synchronization with the clock of the signal CLKH, the image data of each pixel in the image sensors 109 is sequentially output to the external analog output terminals. Thus, the A/D converters 31 to 38 perform A/D conversion by the signal CLKAD that is synchronized with the signal CLKH.

In the combinations of the A/D converters 11 to 18 and the tiled image sensors 109, the A/D converters 11, 14, 15, and 18 are combined with four image sensors respectively, and the A/D converters 12, 13, 16, and 17 are combined with three image sensors respectively. In this configuration, in the irradiation field in the 11-inch mode, all of the A/D converters 11 to 18 operate and perform reading in the irradiation region. In the irradiation field 108 in the 6-inch mode, similarly to the 11-inch mode, all of the A/D converters 11 to 18 operate and perform reading in the irradiation region.

In driving processing of the irradiation field 108 in the 6-inch mode, in the four image sensors that are connected to the A/D converters 11, 14, 15, and 18 for performing A/D conversion to the outside regions, one image sensor close to the central part is valid. Accordingly, it is not necessary to read all of the image regions. If reading conditions of the A/D converters 11 to 18 are the same, the reading speeds of the A/D converters 11 to 18 are limited by A/D conversion time in a widest A/D conversion region. Accordingly, in the driving processing in the irradiation field 108 in the 6-inch mode, if reading of image sensors 51 to 54 in the periphery away from the central part is not performed and all of the A/D converters 11 to 18 perform the A/D conversion of the three image sensors respectively, the speed limitation factor due to the difference in the A/D conversion regions can be eliminated.

The reading methods in the 11-inch mode and the 6-inch mode are described with reference to the time charts. FIG. 10A is a time chart illustrating the read control in the 11-inch mode for reading the all image regions in the flat panel 1107 illustrated in FIG. 8.

In FIG. 10A, signals SEL1 and SEL2 are two-bit signals. The numbers 0 to 3 in the time chart indicate states of the two-bit signals. The numbers illustrated in the input terminals of the analog multiplexers 41 to 48 in FIG. 8 correspond to the numbers of the signal SEL1 and the signal SEL2 in the time chart respectively. For example, if outputs of the signals SEL1 and SEL2 are "0", inputs of "0" of the analog multiplexers are selected, and output to the amplifies of next stage.

The analog multiplexers 41, 44, 45, and 48 that switch the analog image data from the four image sensors are controlled by the signal SEL1. The analog multiplexers 42, 43, 46, and 47 that switch the analog image data from the three image sensors are controlled by the signal SEL2. The inputs of the analog multiplexers 41, 44, 45, and 48 are configured to select, if the signal SEL1 is "3", outputs of the outmost image sensors 51 to 54.

As illustrated in FIG. 10A, in the reading processing in the 11-inch mode, the pixels of one line in the eight A/D conversion regions are read in the order of "0", "1", "2", and when the signal SEL1 is "3", the image sensors 51 to 54 of both end pats are read. The read image data is converted into a raster image in the imaging unit control apparatus 106, and the raster image is transferred to the system control and image processing apparatus 101. Since the outputs of the outmost image sensors 51 to 54 are selected when the signal SEL1 is "3", the outputs of the outmost image sensors 51 to 54 are not necessary in the reading processing in the 6-inch mode. Accordingly, as illustrated in FIG. 10B, the output patterns of the signals SEL1 and SEL2 are the same. As a result, reading drive processing can be simplified, and the reading of the image data of one line can be completed in three quarters of the reading time.

As described in the present exemplary embodiment, if the outputs of the plurality of image sensors are converted by one A/D converter and the image data is output, time T" necessary for reading the pixel data of one frame from the flat panel 1107 is calculated by the following equation 8 using the maximum number S of image sensors connected to one A/D converter, the time Vt necessary for vertical synchronization of the image sensor, the number of horizontal pixels P1 of the image sensor, the number of vertical lines L1 in the image sensor, the reading line interval I1, and the cycle t1 of the signal CLKH.

$$T1''=(P1+I1) \cdot S \sim L1 \cdot t1 + Vt \qquad \text{equation 8}$$

The number of lines N appropriate for starting the reading to minimize the output delay time can be calculated by the following equation 9.

$$N = L1 - \frac{L1 \cdot T2}{2 \cdot T1''} \qquad \text{equation 9}$$
$$= L1 - \frac{L1 \cdot (P2 \cdot L2 + I2 \cdot (L2-1)) \cdot t2}{2 \cdot ((P1+I1) \cdot S \cdot L1 \cdot t1 + Vt)}$$

A fourth exemplary embodiment of the present invention is described. In the fourth exemplary embodiment, the flat panel 1107 according to the third exemplary embodiment is formed by image sensors having a binning processing function. In the present exemplary embodiment, the number of lines N appropriate for starting reading to minimize the output delay time is calculated by the following equation 10 taking the binning mode coefficient M and blank shift time Tb of the vertical shift register in the binning processing into consideration.

$$N = \frac{L1}{M} - \frac{L1 \cdot \left(\frac{P2 \cdot L2}{M^2} + I2 \cdot \left(\frac{L2}{M}-1\right)\right) \cdot t2}{2 \cdot \left(\frac{P1}{M}+I1\right) \cdot S \cdot \frac{L1}{M} \cdot t1 + \frac{L1}{M} \cdot (M-1) \cdot Tb + Vt} \qquad \text{equation 10}$$

$$M = \begin{cases} 1: \text{ no binning} \\ 2: 2 \times 2 \text{ binning} \\ 4: 4 \times 4 \text{ binning} \end{cases}$$

In the above-described exemplary embodiments, at the timing the reading of the image data from the flat panel is completed, the reading of the image data from the frame memory 208 starts such that the image data read from the frame memory becomes the half (½) frame. By this processing, the output delay time of the image data can be shortened to a minimum. Accordingly, in the present invention, moving image shooting and data transmission can be performed in a constant cycle at a high speed without lack using the simple configuration.

The exemplary embodiments of the present invention can be implemented by executing the following processing. That is, software (program) to implement the functions of the above-described exemplary embodiments is supplied to a system or an apparatus via a network or various storage media. A computer (or CPU or micro processing unit (MPU)) of the system or the apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-217376 filed Sep. 28, 2010, which is hereby incorporated by reference herein in its entirety.

What is claimed is:

1. An imaging apparatus comprising:
an imaging unit in which a plurality of image sensors is arranged;
an imaging control unit configured to read image data from each region formed by dividing the imaging unit;
a write control unit configured to write the image data read by the imaging control unit in a recording unit; and
a read control unit configured to start reading the image data from the recording unit in response to that the writing of the image data to the recording unit becomes a predetermined state.

2. The imaging apparatus according to claim 1, wherein the read control unit starts reading the image data from the recording unit in response to that the number of lines in which the image data is written in the recording unit becomes a predetermined number of lines.

3. The imaging apparatus according to claim 2, wherein the predetermined number of lines is the number of lines corresponding to an imaging mode of the imaging apparatus.

4. The imaging apparatus according to claim 3, wherein the predetermined number of lines is calculated by an equation 11, $$N = \frac{L1}{M} - \frac{L1 \cdot \left(\frac{P2 \cdot L2}{M^2} + I2 \cdot \left(\frac{L2}{M} - 1\right)\right) \cdot t2}{2 \cdot M \cdot \left(\left(\frac{P1}{M} + I1\right) \cdot \frac{L1}{M} \cdot t1 + \frac{L1}{M} \cdot (M-1) \cdot Tb + Vt\right)} \quad \text{equation 11}$$

$$M = \begin{cases} 1: \text{ no binning} \\ 2: 2 \times 2 \text{ binning} \\ 4: 4 \times 4 \text{ binning} \end{cases}$$

wherein Vt is time necessary for vertical synchronization of the image sensor, P1 is the number of horizontal pixels of the image sensor, L1 is the number of vertical lines of the image sensor, I1 is a line interval in reading the image data from the image sensor, t1 is a cycle of a clock in reading the image data from the image sensor, Tb is line shift time of the image sensor in a binning mode, P2 is the number of pixels in the horizontal direction in the image data of one frame read from the recording unit, L2 is the number of lines in the vertical direction in the image data of one frame read from the recording unit, I2 is a line interval in reading the image data from the recording unit, t2 is a cycle of a clock in reading the image data from the recording unit, and M is a binning mode coefficient.

5. The imaging apparatus according to claim 1, further comprising a selection unit configured to select an image sensor for outputting the image data according to a shooting mode in the imaging apparatus in a predetermined region in each of the regions formed by dividing the imaging unit.

6. The imaging apparatus according to claim 5, wherein the predetermined number of lines is calculated by an equation 12, $$N = \frac{L1}{M} - \frac{L1 \cdot \left(\frac{P2 \cdot L2}{M^2} + I2 \cdot \left(\frac{L2}{M} - 1\right)\right) \cdot t2}{2 \cdot \left(\frac{P1}{M} + I1\right) \cdot S \cdot \frac{L1}{M} \cdot t1 + \frac{L1}{M} \cdot (M-1) \cdot Tb + Vt} \quad \text{equation 12}$$

$$M = \begin{cases} 1: \text{ no binning} \\ 2: 2 \times 2 \text{ binning} \\ 4: 4 \times 4 \text{ binning} \end{cases}$$

wherein Vt is time necessary for vertical synchronization of the image sensor, P1 is the number of horizontal pixels of the image sensor, L1 is the number of vertical lines of the image sensor, I1 is a line interval in reading the image data from the image sensor, t1 is a cycle of a clock in reading the image data from the image sensor, Tb is line shift time of the image sensor in a binning mode, P2 is the number of pixels in the horizontal direction in the image data of one frame read from the recording unit, L2 is the number of lines in the vertical direction in the image data of one frame read from the recording unit, I2 is a line interval in reading the image data from the recording unit, t2 is a cycle of a clock in reading the image data from the recording unit, M is a binning mode coefficient, and S is a maximum number of image sensors connected to one analog-digital (A/D) conversion unit disposed in the each region.

7. A method for controlling an imaging apparatus including an imaging unit in which a plurality of image sensors is arranged, the method comprising:
reading image data from each region formed by dividing the imaging unit;
writing the read image data in a recording unit; and
starting reading of the image data from the recording unit in response to that the writing of the image data to the recording unit becomes a predetermined state.

8. A program for causing a computer to execute a method for controlling an imaging apparatus including an imaging unit in which a plurality of image sensors is arranged, the method comprising:
reading image data from each region formed by dividing the imaging unit;
writing the read image data in a recording unit; and
starting reading of the image data from the recording unit in response to that the writing of the image data to the recording unit becomes a predetermined state.

* * * * *